US008462779B2

(12) United States Patent
Igarashi et al.

(10) Patent No.: US 8,462,779 B2
(45) Date of Patent: Jun. 11, 2013

(54) FRAME TRANSFER APPARATUS AND FRAME TRANSFER METHOD (75) Inventors: Ken Igarashi, Kawasaki (JP); Ko Takatori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 74 days.

(21) Appl. No.: 12/627,005

(22) Filed: Nov. 30, 2009

(65) Prior Publication Data

US 2010/0158019 A1 Jun. 24, 2010

(30) Foreign Application Priority Data

Dec. 22, 2008 (JP) ................................. 2008-326430

(51) Int. Cl.
*H04L 12/28* (2006.01)
(52) U.S. Cl.
USPC .......................... 370/389; 370/40; 370/395.54
(58) Field of Classification Search
USPC ............... 370/389, 395, 400, 395.53, 395.54, 370/401
See application file for complete search history.

(56) References Cited

U.S. PATENT DOCUMENTS

| | | | | |
|---|---|---|---|---|
| 6,353,620 | B1 * | 3/2002 | Sallberg et al. | ............... 370/465 |
| 6,859,459 | B1 | 2/2005 | Yamashita | |
| 2002/0091947 | A1 * | 7/2002 | Nakamura | ................... 713/202 |
| 2003/0142680 | A1 * | 7/2003 | Oguchi | ......................... 370/400 |
| 2006/0203735 | A1 * | 9/2006 | Takatori et al. | ............... 370/242 |
| 2006/0251065 | A1 * | 11/2006 | Hamamoto et al. | .......... 370/389 |
| 2007/0230469 | A1 | 10/2007 | Teshima | |
| 2008/0013547 | A1 * | 1/2008 | Klessig et al. | ........... 370/395.53 |

FOREIGN PATENT DOCUMENTS

| | | |
|---|---|---|
| JP | 6-97965 A | 4/1994 |
| JP | 11-122303 | 4/1999 |
| JP | 2001-144793 A | 5/2001 |
| JP | 2007-89030 | 4/2007 |
| JP | 2007-266850 | 10/2007 |

OTHER PUBLICATIONS

Japanese Office Action mailed Sep. 25, 2012 for corresponding Japanese Application No. 2008-326430, with English-language Translation.

* cited by examiner

*Primary Examiner* — Dang Ton
*Assistant Examiner* — Mandish Randhawa
(74) *Attorney, Agent, or Firm* — Fujitsu Patent Center (57) ABSTRACT A frame transfer apparatus includes a plurality of ports for transmitting and receiving frames which include transmitting source information and transmitting destination information. The apparatus further includes a processing unit to store information which relates the transmitting source information included in the received frame and port information of a port which receives the received frame, a frame transmitting unit to transmit the received frame via a port that is identified by the port information which corresponds to the transmitting destination information included in the received frame and is extracted from the information stored by the processing unit, and a learning information erasing unit to erase the information stored by the processing unit for every predetermined time.

14 Claims, 10 Drawing Sheets

| FIELD | LENGTH (Bytes) | CONTENTS |
|---|---|---|
| DA | 6 | TRANSMITTING DESTINATION INFO (MAC ADDRESS OF DESTINATION APPARATUS) |
| SA | 6 | TRANSMITTING SOURCE INFO (MAC ADDRESS OF TRANSMITTING APPARATUS) |
| VLAN TAG | 4 | INCLUDES TYPE VALUE (2 Bytes) & TAG CONTROL INFO (2 Bytes), & VLAN ID (10 bits) IN TAG CONTROL INFO |
| Type/Length | 2 | IDENTIFICATION NO. FOR IDENTIFYING PROTOCOL OF NETWORK LAYER IN HIGHER LEVEL |
| Data | 42-1500 | USER DATA |
| FCS | 4 | FRAME CHECK SEQUENCE (CHECK SUM VALUE FROM DA TO Data) |

FIG.4

| PORT ID | MAC ADDRESS | VLAN TAG |
|---|---|---|
| #1 | 04-A3-43-5F-43-23 | 100 |
| #2 | 32-61-3C-4E-B6-05 | 80 |
| ... | ... | ... |
| ... | ... | ... |
| ... | ... | ... |
| ... | ... | ... |

FRAME TRANSFER APPARATUS AND FRAME TRANSFER METHOD

CROSS-REFERENCE TO RELATED APPLICATIONS

This application is based upon and claims the benefit of priority of the prior Japanese Patent Application No. 2008-326430, filed on Dec. 22, 2008, the entire contents of which are incorporated herein by reference.

FIELD

The present invention generally relates to frame transfer apparatuses and frame transfer methods for transferring frames received by a first apparatus to a second apparatus that is connected to the first apparatus.

BACKGROUND

If a failure is generated in a communication network having a redundant structure, the communication is resumed by changing a route of the frame transfer. In relation to such a redundant structure, a transmission apparatus has been proposed which suppresses the generation of flooding in order to prevent the band of the operating network from becoming limited. An example of such a transmission apparatus has been proposed in a Japanese Laid-Open Patent Publication No. 2007-266850.

On the other hand, a frame transfer apparatus which transfers frames employs a protocol that performs a route control between apparatuses and a mechanism that recognizes a failure generated in each apparatus. For example, the Ether (registered trademark) network having the redundant structure employs a route control protocol that avoids a loop structure, such as the ring protocol and the spanning tree protocol.

In order to enable the route control protocol in the case of the ring control, the frame transfer apparatus is provided with a ring port failure detecting part, a network failure judging part to judge whether a failure is generated within the ring network, and a ring protocol part to perform various ring controls including a ring switch.

However, the frame transfer apparatus which enables the route control protocol becomes extremely expensive because the route control protocol is extremely complex, and the maintenance and operation of the communication network formed by the frame transfer apparatus becomes extremely complex.

SUMMARY

Accordingly, it is an object in one aspect of the invention to provide a frame transfer apparatus and a frame transfer method, which forms a network redundant structure without using the route control protocol between apparatuses, in order to facilitate the maintenance and operation of the communication network.

One aspect of the present invention is to provide a frame transfer apparatus including a plurality of ports configured to transmit and receive frames which include transmitting source information and transmitting destination information, a processing unit configured to store information which relates the transmitting source information included in a frame received by a receiving port and port information of the receiving port, a frame transmitting unit configured to transmit the received frame via one or plurality of ports that are identified by the port information which corresponds to the transmitting destination information included in the received frame and is extracted from the information stored by the processing unit, and a learning information erasing unit configured to erase the information stored by the processing unit for every predetermined time.

Another aspect of the present invention is to provide a frame transfer method to be implemented in a frame transfer apparatus having a plurality of ports transmitting and receiving frames which include transmitting source information and transmitting destination information, a processing unit, a frame transmitting unit, and a learning information erasing unit, the frame transfer method including storing, by the processing unit, information which relates the transmitting source information included in the received frame and port information of a port which receives the received frame, transmitting, by the frame transmitting unit, the received frame via a port that is identified by the port information which corresponds to the transmitting destination information included in the received frame and is extracted from the information stored by the processing unit, and erasing, by the learning information erasing unit, the information stored by the processing unit for every predetermined time.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be described with reference to the accompanying drawings.

According to one aspect of the present invention, a frame transfer apparatus has a plurality of ports for transmitting and receiving frames which include transmitting source information and transmitting destination information. The frame transfer apparatus further has a Media Access Control (MAC) learning unit configured to store information (or a MAC learning table) which relates the transmitting source information included in the received frame and port information of the received frame, a frame transmitting unit configured to transmit the received frame via a port that is identified by the port information which corresponds to the transmitting destination information included in the received frame and is extracted from the information stored by the MAC learning unit, and a learning information erasing unit configured to erase the information stored by the MAC learning unit for every predetermined time.

The MAC learning table is not erased if no reference is made to the MAC learning table within a certain time. Instead, the MAC learning table is forcibly erased for every predetermined time regardless of how frequent the reference is made to the MAC learning table, and such a forced erasure will also be referred hereinafter as a "forced aging". As a result, the frame transfer apparatus can modify a communication route when a failure is generated.

In addition, if the frame is received via one of the ports and the transmitting source information included in the frame and other port information are already stored by the MAC learning unit, the MAC learning unit does not store information which relates the transmitting source information included in the received frame and the port information of the one of the ports. Further, the frame transmitting unit discards the received frame instead of transmitting the received frame.

Hence, the frame transfer apparatus performs a MAC learning process according to the first-come-first-served basis if identical frames join, in order to establish the communication route and to prevent a loop of identical frames occurs within the communication network.

Therefore, it is possible to provide a frame transfer apparatus and a frame transfer method, which forms a network redundant structure without using the route control protocol between apparatuses, in order to facilitate the maintenance and operation of the communication network.

A description will now be given of the frame transfer apparatus and the frame transfer method in each embodiment according to the present invention.

Figure 1:
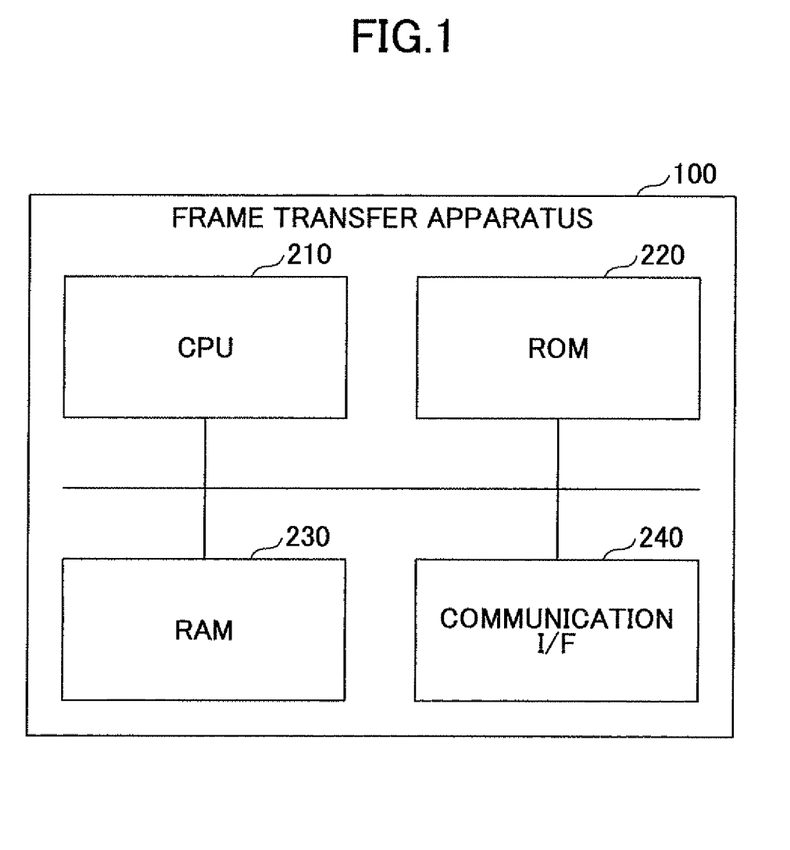
FIG. 1 is a block diagram illustrating an example of a hardware structure of a frame transfer apparatus in an embodiment of the present invention.

A description will be given of a frame transfer apparatus 100 in an embodiment of the present invention, by referring to FIGS. 1 through 5. FIG. 1 is a block diagram illustrating an example of a hardware structure of the frame transfer apparatus 100 in this embodiment. As illustrated in FIG. 1, the frame transfer apparatus 100 includes a Central Processing Unit (CPU) 210, a Read Only Memory (ROM) 220, a Random Access Memory (RAM) 230, and a communication interface (I/F) 240. One CPU 210, one ROM 220, one RAM 230, and one communication I/F 240 are illustrated in FIG. 1, but of course, two or more CPUs 210, two or more ROMs 220, two or more RAMs 230, and two or more communication I/Fs 240 may be provided in the frame transfer apparatus 100.

The CPU 210 executes programs stored in the ROM 220. The CPU 210 performs operation or computation processes with respect to data loaded in the RAM 230, according to instructions of the programs stored in the ROM 220, and controls the operation of the entire frame transfer apparatus 100. The ROM 220 stores programs to be executed by the CPU 210, and various data. The RAM 230 stores programs that are executed and data are loaded in the RAM 230, when the CPU 210 executes the programs stored in the ROM 220. Hence, the RAM 230 temporarily stores intermediate data or operation data when the CPU 210 performs the operation or computation processes.

The communication I/F 240 forms an interface for transmitting information or data to and receiving information or data from an external or peripheral apparatus that has communication control functions and is connected to the frame transfer apparatus 100 via a wireless or cable communication network (not illustrated).

Various parts or functions of the frame transfer apparatus 100 are achieved by the CPU 210 when the CPU 210 executes the programs stored in the ROM 220 and corresponding to the various parts or functions. However, the various parts or functions of the frame transfer apparatus 100 may be achieved by providing corresponding hardware.

Figure 2:
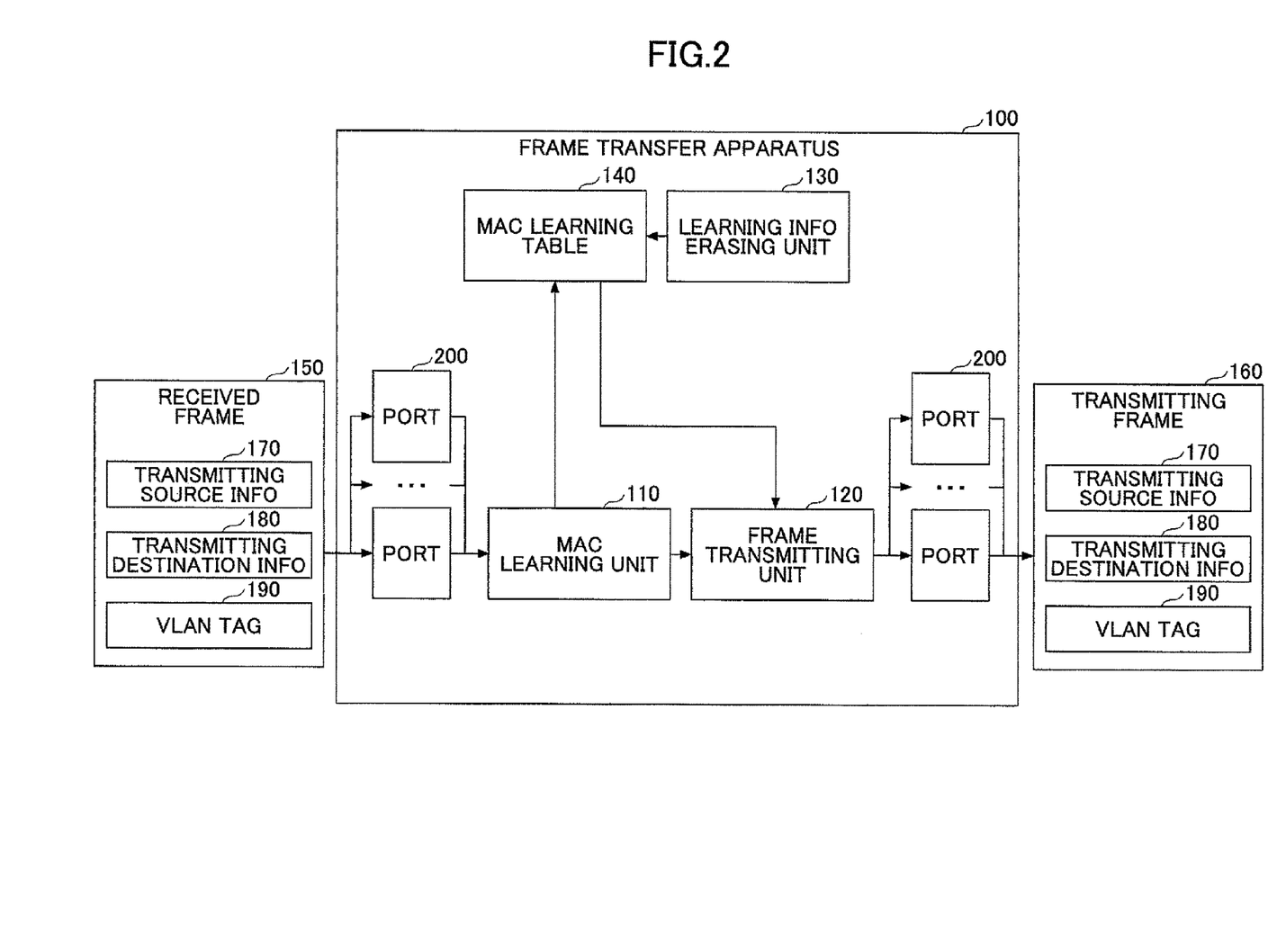
FIG. 2 is a block diagram for explaining an operation of the frame transfer apparatus in the embodiment.

FIG. 2 is a block diagram for explaining an operation of the frame transfer apparatus 100 in this embodiment. As illustrated in FIG. 2, the frame transfer apparatus 100 includes a MAC learning unit (or processing unit) 110, a frame transmitting unit 120, a learning information erasing unit 130, a MAC learning table 140, and a plurality of ports 200. The ports 200 include those that function as the communication I/F 240 to receive a frame (or received frame) 150 from an external apparatus. The ports 200 also include those that function as the communication I/F 240 to transmit a frame (or transmitting frame) 160 to an external apparatus. Each port 200 is identified by a corresponding identifier which will hereinafter referred to as a port ID.

The frame transfer apparatus 100 transmits the received frame 150 from an external apparatus to another external apparatus as the transmitting frame 160. For this reason, the received frame 150 and the transmitting frame 160 are substantially the same. However, for the sake of convenience, the frame received by the frame transfer apparatus 100 is referred to as the received frame 150, and the frame transmitted from the frame transfer apparatus 100 is referred to as the transmitting frame 160. Each of the received frame 150 and the transmitting frame 160 includes transmitting source information 170, transmitting destination information 180, and Virtual Local Area Network (VLAN) tag 190.

Figure 3:
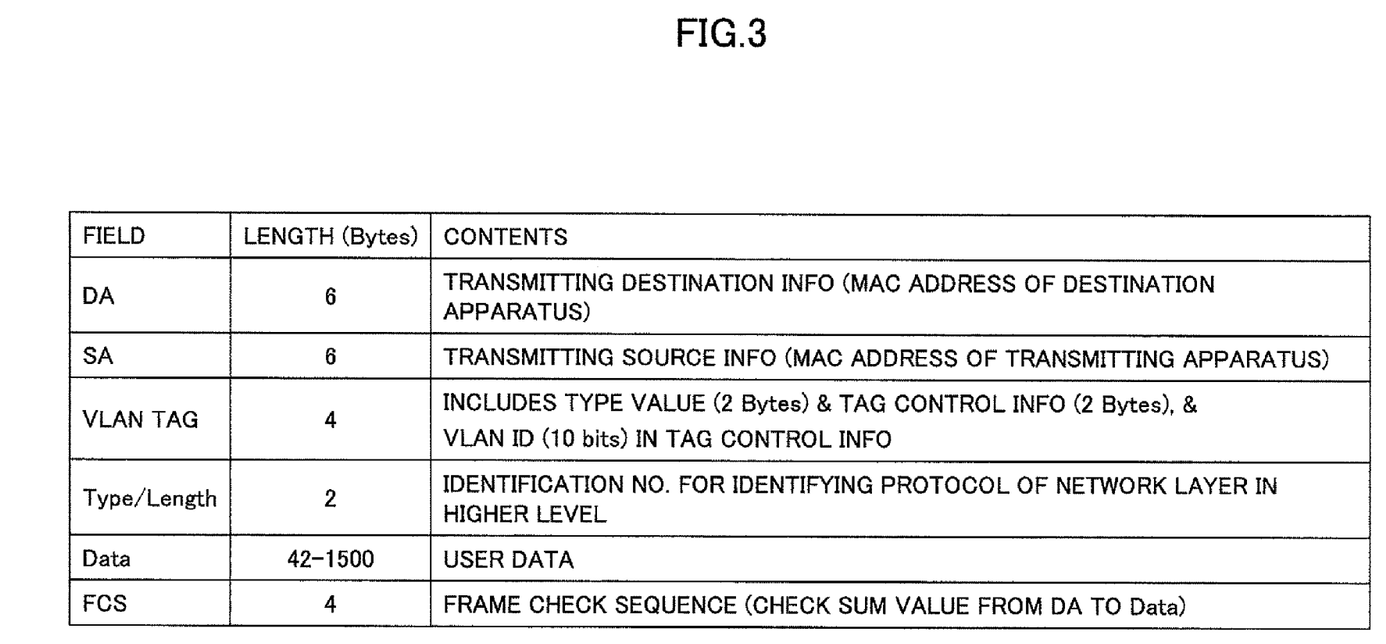
FIG. 3 is a diagram illustrating an example of a frame structure in the embodiment.

FIG. 3 is a diagram illustrating an example of a frame structure of the frames transmitted and received by the frame transfer apparatus 100 in this embodiment. FIG. 3 illustrates a field, a length (Bytes), and contents of the frame. As illustrated in FIG. 3, the transmitting source information 170, indicated by a Source Address (SA) in this example, is a Media Access Control (MAC) address of a source apparatus which originally transmitted the received frame 150. The transmitting destination information 180, indicated by a Destination Address (DA) in this example, is a MAC address of a destination apparatus which is to finally receive the transmitting frame 160. The VLAN tag 190 is indicated by information which identifies a communication network that is virtually formed, that is, a network ID, when forming the communication network by a communication apparatus that includes the frame transfer apparatus 100.

In FIG. 3, "Type/Length" indicates an ID number for identifying a protocol of a network layer in a higher level, "Data" indicates user data, and "FCS" indicates a Frame Check Sequence formed by a check sum value from DA to Data.

The MAC learning unit 110 detects the port ID of the port 200 which received the received frame 150, and extracts the transmitting source information 170 and the VLAN tag 190 from the received frame 150. As a general rule, the MAC learning unit 110 relates and stores the port ID, the transmitting source information 170, and the VLAN tag 190 in the MAC learning table 140.

Figure 4:
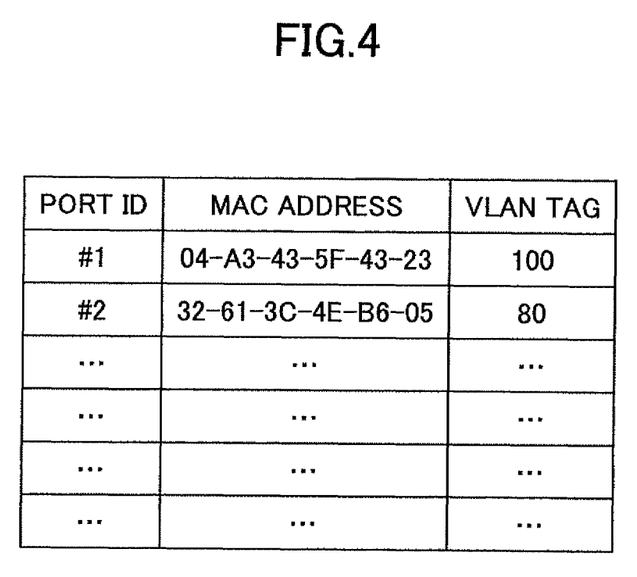
FIG. 4 is a diagram illustrating an example of a structure of a Media Access Control (MAC) learning table in the embodiment.

FIG. 4 is a diagram illustrating an example of a structure of the MAC learning table 140 in the embodiment. As illustrated in FIG. 4, the MAC learning table 140 stores the port ID, the MAC address which is the transmitting source information 170, and the VLAN tag 190, that is, three kinds of data, as a single set. The MAC learning table 140 may be stored in the RAM 230.

When the MAC learning unit 110 receives the received frame 150 which is received by the receiving port 200 and the MAC learning table 140 already stores a combination of the transmitting source information 170 included in the received frame 150 and the port ID of a different port 200 that is different from the receiving port 200 which received the receiving frame 150, the MAC learning unit 110 does not newly store the transmitting source information 170 and the port ID of the different port 200. More particularly, the MAC learning unit 110 searches for the transmitting source information 170 which is related to the received frame 150, within the MAC learning table 140, and does not newly store the combination of the transmitting source information 170, the port ID of the different port 200, and the VLAN tag 190 into the MAC learning table 140 if the transmitting source information 170 is already stored in the MAC learning table 140.

The frame transmitting unit 120 extracts the transmitting destination information 180 from the received frame 150, and searches for a MAC address identical to that of the transmitting destination information 180, within the MAC learning table 140. In addition, the frame transmitting unit 120 transmits the received frame 150 to the external apparatus, as the transmitting frame 160, via a port 200 having the port ID corresponding to the MAC address which is identical to the transmitting destination information 180 and is found in the MAC learning table 140. On the other hand, if the MAC address identical to the MAC address is not found in the MAC learning table 140, the frame transmitting unit 120 performs the so-called flooding process in which the received frame 150 is transmitted to the external apparatus, as the transmitting frame 160, via all of the ports 200 excluding the port 200 which received the receiving frame 150.

In addition, the frame transmitting unit 120 searches for a MAC address identical to that of the transmitting source information 170 included in the received frame 150, within the MAC learning table 140. If the MAC address identical to that of the transmitting source information 170 is already stored in the MAC learning table 140 for a port ID of a port other than the port 200 which received the received frame 150, the frame transmitting unit 120 does not transmit the received frame 150 to the external apparatus, and the received frame 150 is discarded.

Figure 5:
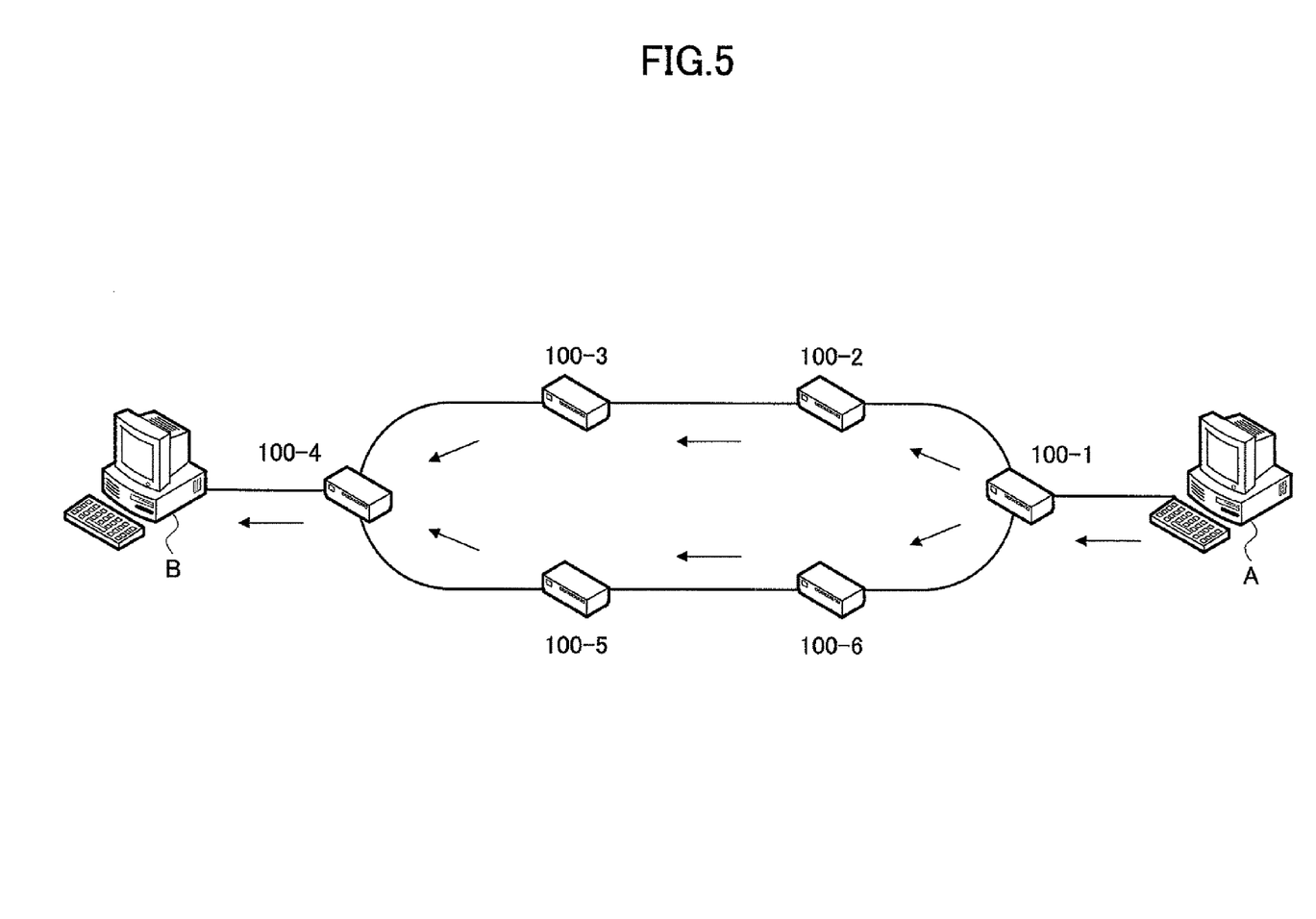
FIG. 5 is a diagram illustrating an example of a communication network formed by the frame transfer apparatus in the embodiment.

FIG. 5 is a diagram illustrating an example of a communication network formed by the frame transfer apparatus in this embodiment. As indicated by arrows in FIG. 5, it is possible to independently or self-reliably establish a communication route from a terminal apparatus A and a terminal apparatus B by the processes performed by the MAC learning unit 110 and the frame transmitting unit 120 of each of the frame transfer apparatuses 100-1 through 100-6, without generating a loop between the terminal apparatuses A and B. Further, the shortest communication route is established between the terminal apparatuses A and B. In FIG. 5, each of the frame transfer apparatuses 100-1 through 100-6 has the structure of the frame transfer apparatus 100 described above.

The processes of the MAC learning unit 110 and the frame transmitting unit 120 establish the communication route, but may not modify the communication route when a network failure or the like is generated. Hence, the frame transfer apparatus 100 includes the learning information erasing unit 130 which periodically performs a forced aging process. By the provision of the learning information erasing unit 130, the frame transfer apparatus 100 may periodically look into the communication route and establish a communication route which enables the frame to reach the destination in a shortest time. In other words, by periodically performing the forced aging process, the frame transfer apparatus 100 may modify the communication route when a network failure or the like is generated.

The learning information erasing unit 130 performs the forced aging process which forcibly erases the contents of (or data in) the MAC learning table 140 for every predetermined time. The predetermined time may be set at random or, may be set to a different time for every forced aging process that is performed.

If the timings at which the forced aging processes are performed match among a plurality of frame transfer apparatuses 100 in the communication network, such as the frame transfer apparatuses 100-1 through 100-6 illustrated in FIG. 5, the frames transmitted by the flooding processes are transmitted in a spread state within the communication network, to thereby increase the load on the communication network (that is, the network load). However, if the timings of the forced aging processes are different between the adjacent frame transfer apparatuses 100, the frame transfer apparatus 100 which receives the frame transmitted by the flooding process may prevent scattering of the frame by performing a normal process, and consequently suppress the load on the communication network from increasing. In view of the above, the learning information erasing unit 130 performs the forced aging process at execution intervals that are different for each of the frame transfer apparatuses 100, as will be described hereunder.

The predetermined time described above may be determined based on an output value that is obtained by applying a predetermined function with respect to identification information unique to the frame transfer apparatus 100, such as the MAC address of the frame transfer apparatus 100. For example, the predetermined time may be determined based on a converted value which is in units of milliseconds (ms) and is obtained by converting the MAC address of the frame transfer apparatus 100 using a hash function into a decimal value having three to four digits.

On the other hand, when the frame transfer apparatus 100 periodically performs the forced aging process, the communication route may be modified when the failure is generated, but the time required to modify the communication route is equal to the execution intervals at which the forced aging process is performed, and the execution intervals and the load on the communication network are in a tradeoff relationship. In other words, if the flooding process is periodically generated due to the forced aging process and the execution intervals are relatively long, the time required to modify the communication route becomes relatively long when the failure is generated and the load on the communication network decreases. In other words, an interrupted time of the communication becomes relatively long in this case. On the other hand, if the flooding process is periodically generated due to the forced aging process and the execution intervals are relatively short, the time required to modify the communication route becomes relatively short when the failure is generated and the load on the communication network increases. In other words, the interrupted time of the communication becomes relatively short in this latter case.

Hence, if the load on the communication network is decreased by one flooding process, it would become possible to shorten the execution intervals of the forced aging process. That is, from the point of view of reducing the interrupted time of the communication while suppressing the load on the communication network, the learning information erasing unit 130 limits the range in which the forced aging process is performed in the following manner.

The learning information erasing unit 130 may be configured to erase only the contents that are stored in relation to one ore more specific VLAN tags 190 within the MAC learning table 140. For example, in the case of the MAC learning table 140 illustrated in FIG. 4, the learning information erasing unit 130 erases only the contents stored in relation to the VLAN tag 190 indicated by "100". Further, the learning information erasing unit 130 may be configured to sequentially perform the erasing process with respect to different VLAN tags 190. In this case, the learning information erasing unit 130 performs the erasing process with respect to the VLAN tag 190 indicated by "80" at an arbitrary time, and performs the erasing process with respect to the VLAN tag 190 indicated by "100" at a different arbitrary time, for example. Therefore, it is possible to perform the forced aging process for every communication route that is logically formed, and the communication route may be modified independently or self-reliably by the frame transfer apparatus 100.

The learning information erasing unit 130 may be configured to erase only the contents that are stored in relation to one or more specific port IDs within the MAC learning table 140. For example, in the case of the MAC learning table 140 illustrated in FIG. 4, the learning information erasing unit 130 erases only the contents stored in relation to the port ID indicated by "#1". Further, the learning information erasing unit 130 may be configured to sequentially perform the erasing process with respect to different port IDs. In this case, the learning information erasing unit 130 performs the erasing process with respect to the port ID indicated by "#1" at an arbitrary time, and performs the erasing process with respect to the port ID indicated by "#2" at a different arbitrary time, for example. Therefore, it is possible to perform the forced aging process for every communication route that is logically formed, and the communication route may be modified independently or self-reliably by the frame transfer apparatus 100.

Therefore, the frame transfer apparatus 100 may form a network redundant structure without using the route control protocol between the apparatuses, to thereby facilitate the maintenance and operation of the communication network.

Next, a description will be given of the frame transfer process and the forced aging process of the frame transfer apparatus 100 in conjunction with examples, by referring to FIGS. 6 through 10. A description will also be given with respect to a plurality of types of forced aging processes.

Figure 6:
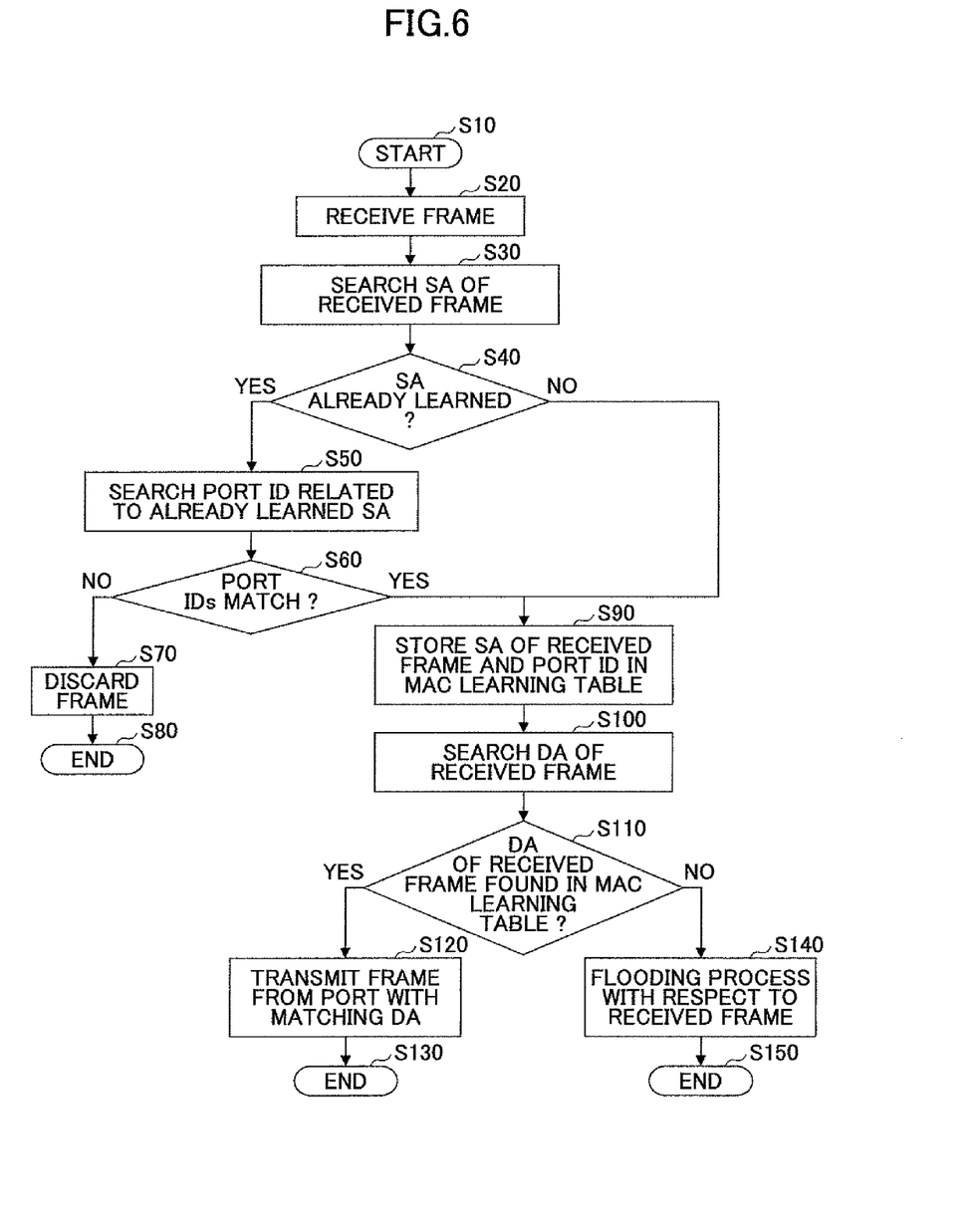
FIG. 6 is a flow chart for explaining an example of a frame transfer process of the frame transfer apparatus in the embodiment.

First, a description will be given of the frame transfer process of the frame transfer apparatus 100, by referring to FIG. 6. FIG. 6 is a flow chart for explaining an example of the frame transfer process of the frame transfer apparatus 100 in this embodiment. The frame transfer process is mainly performed by the MAC learning unit 110 and the frame transmitting unit 120 described above.

In FIG. 6, the frame transfer apparatus 100 starts the frame transfer process in a step S10, and receives the received frame 150 via the port 200 in a step S20. In a step S30, the MAC learning unit 110 extracts the transmitting source information 170 from the received frame 150, and searches for the transmitting source information 170 within the MAC learning table 140. In other words, a search is made within the MAC learning table 140 using the transmitting source information 170 as a search key or index.

In a step S40, the MAC learning unit 110 decides whether the transmitting source information 170 is found within the MAC learning table 140. If the transmitting source information 170 is found within the MAC learning table 140 and the decision result in the step S40 is YES, the MAC learning unit 110 searches for the port ID that is stored in the MAC learning table 140 in correspondence with (or in relation to) the transmitting source information 170, and extracts the port ID that is found, in a step S50. In a step S60, the MAC learning unit 110 decides whether the port ID extracted from the MAC learning table 140 matches the port ID of the port 200 which received the received frame 150, by comparing the port IDs. If the compared port IDs match and the decision result in the step S60 is YES, the process advances to a step S90. On the other hand, if the compared port IDs do not match and the decision result in the step S60 is NO, the process advances to a step S70. In the step S70, the frame transmitting unit 120 discards the received frame 150 without transmitting the received frame 150 to an external apparatus, and the frame transfer apparatus 100 ends the frame transfer process in a step S80.

If the MAC learning unit 110 does not find the transmitting source information 170 within the MAC learning table 140 and the decision result in the step S40 is NO or, the decision result in the step S60 is YES, the MAC learning unit 110 relates and stores the transmitting source information 170 extracted from the received frame 150, the VLAN tag 190, and the port ID which received the received frame 150 into the MAC learning table 140 in the step S90.

In a step 100, the frame transmitting unit 120 extracts the transmitting destination information 180 from the received frame 150, and searches for the transmitting destination information 180 within the MAC learning table 140. In other words, a search is made within the MAC learning table 140 using the transmitting destination information 180 as a search key or index. In a step S110, the frame transmitting unit 120 decides whether the transmitting destination information 180 is found within the MAC learning table 140. If the transmitting destination information 180 is found within the MAC learning table 140 and the decision result in the step S110 is YES, the frame transmitting unit 120 searches for the port ID that is stored in the MAC learning table 140 in correspondence with (or in relation to) the transmitting destination information 180, and extracts the port ID that is found, in a step S120. In addition, the frame transmitting unit 120 transmits the received frame 150 to the external apparatus, as the transmitting frame 160, via the port 200 having the extracted port ID, in the step 120. The frame transfer apparatus 100 ends the frame transfer process in a step S130.

If the frame transmitting unit 120 does not find the transmitting destination information 180 within the MAC learning table 140 and the decision result in the step S110 is NO, the frame transmitting unit 120 performs the so-called flooding process in which the received frame 150 is transmitted to the external apparatus, as the transmitting frame 160, via all of the ports 200 excluding the port 200 which received the receiving frame 150, in a step S140. The frame transfer apparatus 100 ends the frame transfer process in a step S150.

Figure 7:
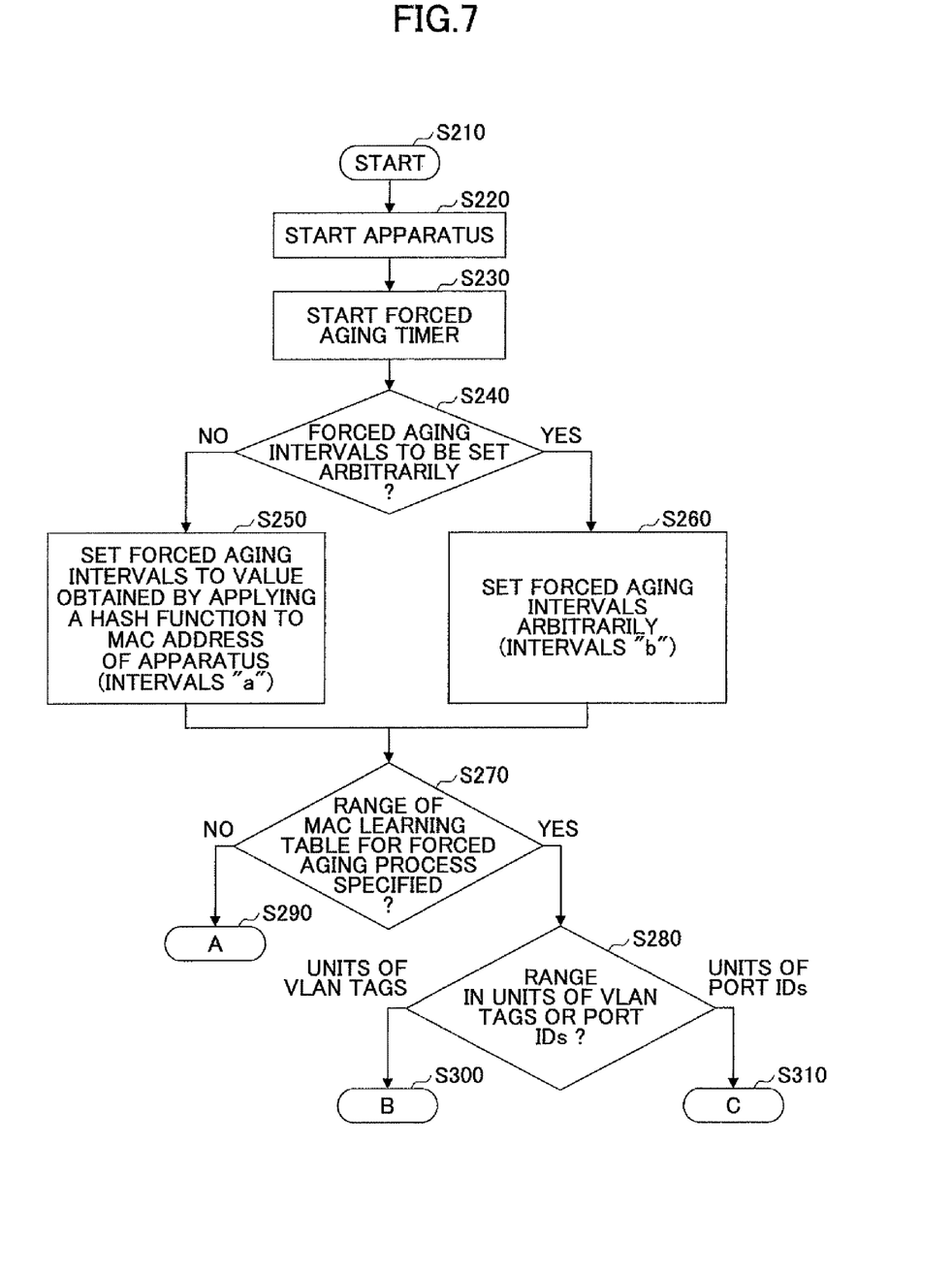
FIG. 7 is a flow chart for explaining an example of a fundamental process of a forced aging process of the frame transfer apparatus in the embodiment.

Next, a description will be given of a fundamental process of the forced aging process of the frame transfer apparatus 100, by referring to FIG. 7. FIG. 7 is a flow chart for explaining an example of the fundamental process of the forced aging process of the frame transfer apparatus in the embodiment. The forced aging process described hereunder is mainly performed by the learning information erasing unit 130.

In FIG. 7, the frame transfer apparatus 100 starts the fundamental process of the forced aging process in a step S210, and the frame transfer apparatus 100 is started in a step S220. The learning information erasing unit 130 starts a forced aging timer (not illustrated) in a step S230. The forced aging timer is used to set the predetermined time when the learning information erasing unit 130 erases the information within the MAC learning table 140 for every predetermined time. The forced aging timer may be provided within the learning information erasing unit 130 or, externally connected to the learning information erasing unit 130. For example, the forced aging timer may be formed by an internal timer of the CPU 210.

In a step S240, the learning information erasing unit 130 decides whether the forced aging intervals are to be set arbitrarily. If the decision result in the step S240 is YES, the learning information erasing unit 130 sets the execution intervals of the forced aging process to a value "b" using the forced aging timer, in a step S250.

On the other hand, if the decision result in the step S240 is NO, the learning information erasing unit 130 sets the execution intervals of the forced aging process to a value "a" that is obtained by applying a function, such as the hash function, with respect to the identification information unique to the frame transfer apparatus 100, such as the MAC address of the frame transfer apparatus 100. For example, the value "a" may be determined based on a converted value which is in units of milliseconds (ms) and is obtained by converting the MAC address of the frame transfer apparatus 100 using the hash function into a decimal value having three to four digits.

After the step S250 or S260, the process advances to a step S270. In the step S270, the learning information erasing unit 130 decides whether a range of the MAC learning table 140, for which the forced aging process is performed, has been specified. If the decision result in the step S270 is NO, the process advances to a step S290 which will be described later in conjunction with FIG. 8. On the other hand, if the decision result in the step S270 is YES, the process advances to a step S280.

In the step S280, the learning information erasing unit 130 decides whether the specified range of the MAC learning table 140 is in units of the VLAN tag 190 or in units of the port ID. The process advances to a step S300 which will be described later in conjunction with FIG. 9 if the step S280 decides that the specified range of the MAC learning table 140 is in units of the VLAN tag 190. On the other hand, the process advances to a step S310 which will be described later in conjunction with FIG. 10 if the step S280 decides that the specified range of the MAC learning table 140 is in units of the port ID.

Figure 8:
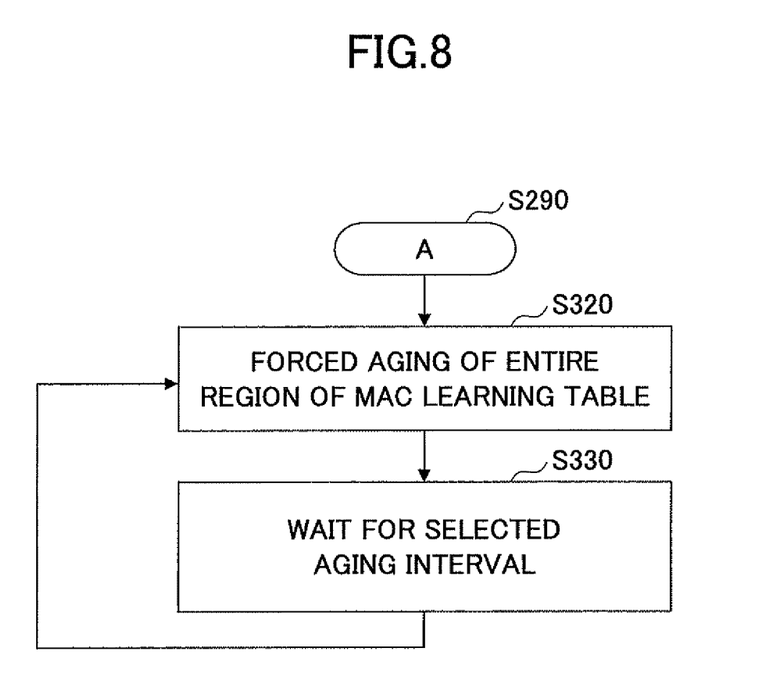
FIG. 8 is a flow chart for explaining the forced aging process of the frame transfer apparatus in the embodiment.

Next, a description will be given of an example of the forced aging process of the frame transfer apparatus 100, which erases the entire region of the MAC learning table 140, by referring to FIG. 8. FIG. 8 is a flow chart for explaining this forced aging process of the frame transfer apparatus 100 in this embodiment.

In FIG. 8, the learning information erasing unit 130 starts the forced aging process in the step S290, and erases the entire region of the MAC learning table 140 in a step S330. In the step S330, the learning information erasing unit 130 waits for the execution interval "a" set in the step S250 or the execution interval "b" set in the step S260, and after the execution interval "a" or "b" elapses, the learning information erasing unit 130 erases the entire region within the MAC learning table 140 in the step S320. The frame transfer apparatus 100 repeats the process of the steps S320 and S330.

Figure 9:
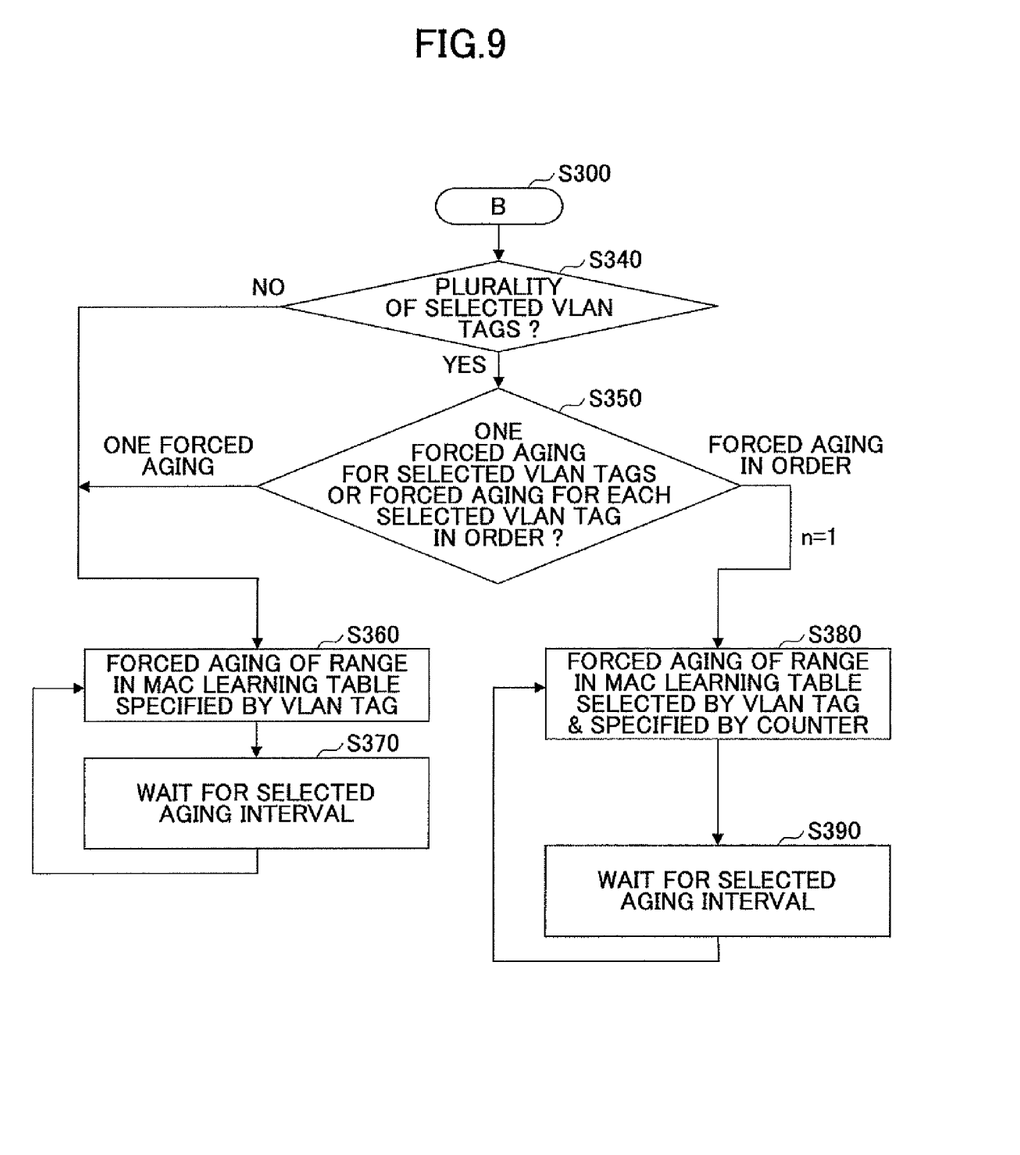
FIG. 9 is a flow chart for explaining the forced aging process of the frame transfer apparatus in the embodiment.

Next, a description will be given of an example of the forced aging process of the frame transfer apparatus 100, which erases the MAC learning table 140 in units of the VLAN tag 190, by referring to FIG. 9. FIG. 9 is a flow chart for explaining this forced aging process of the frame transfer apparatus 100 in this embodiment.

The learning information erasing unit 130 starts the forced aging process in the step S300. In a step S340, the learning information erasing unit 130 decides whether a plurality of VLAN tags 190 have been selected when executing the forced aging process. If only one VLAN tag 190 has been selected and the decision result in the step S340 is NO, the process advances to a step S360 which will be described later.

On the other hand, if the decision result in the step S340 is YES, the learning information erasing unit 130 decides whether one forced aging process is to be performed periodically for the plurality of VLAN tags 190 that have been selected or, the forced aging process is to be sequentially performed (that is, performed in an order) periodically for the plurality of VLAN tags 190 that have been selected, in a step S350. The process advances to the step S360 in the former case in the step S350, and a counter (not illustrated) which counts the number of selected VLAN tags 190 is set to "1" and the process advances to a step S380 in the latter case in the step S350. The counter may be provided within the learning information erasing unit 130 or, externally connected to the learning information erasing unit 130. For example, the counter may be formed by an internal timer of the CPU 210.

In the step S360, the learning information erasing unit 130 erases the information within the MAC learning table 140 in a range corresponding to the one or plurality of VLAN tags 190 that have been selected. In a step S370, the learning information erasing unit 130 waits for the execution interval "a" set in the step S250 or the execution interval "b" set in the step S260, and after the execution interval "a" or "b" elapses, the learning information erasing unit 130 again erases the information within the MAC learning table 140 in the step S360. The frame transfer apparatus 100 repeats the process of the steps S360 and S370.

On the other hand, in the step S380, the learning information erasing unit 130 erases the information within the MAC learning table 140 in a range corresponding to the VLAN tag 190 that has been selected and is specified by the counter. The counter specifies the selected VLAN tag 190 in the order of the selected VLAN tags 190. The counter is incremented by "1" after the forced aging in the step S380 ends. In a step S390, the learning information erasing unit 130 waits for the execution interval "a" set in the step S250 or the execution interval "b" set in the step S260, and after the execution interval "a" or "b" elapses, the learning information erasing unit 130 again erases the information within the MAC learning table 140 in the step S380. The frame transfer apparatus 100 repeats the process of the steps S360 and S370.

Figure 10:
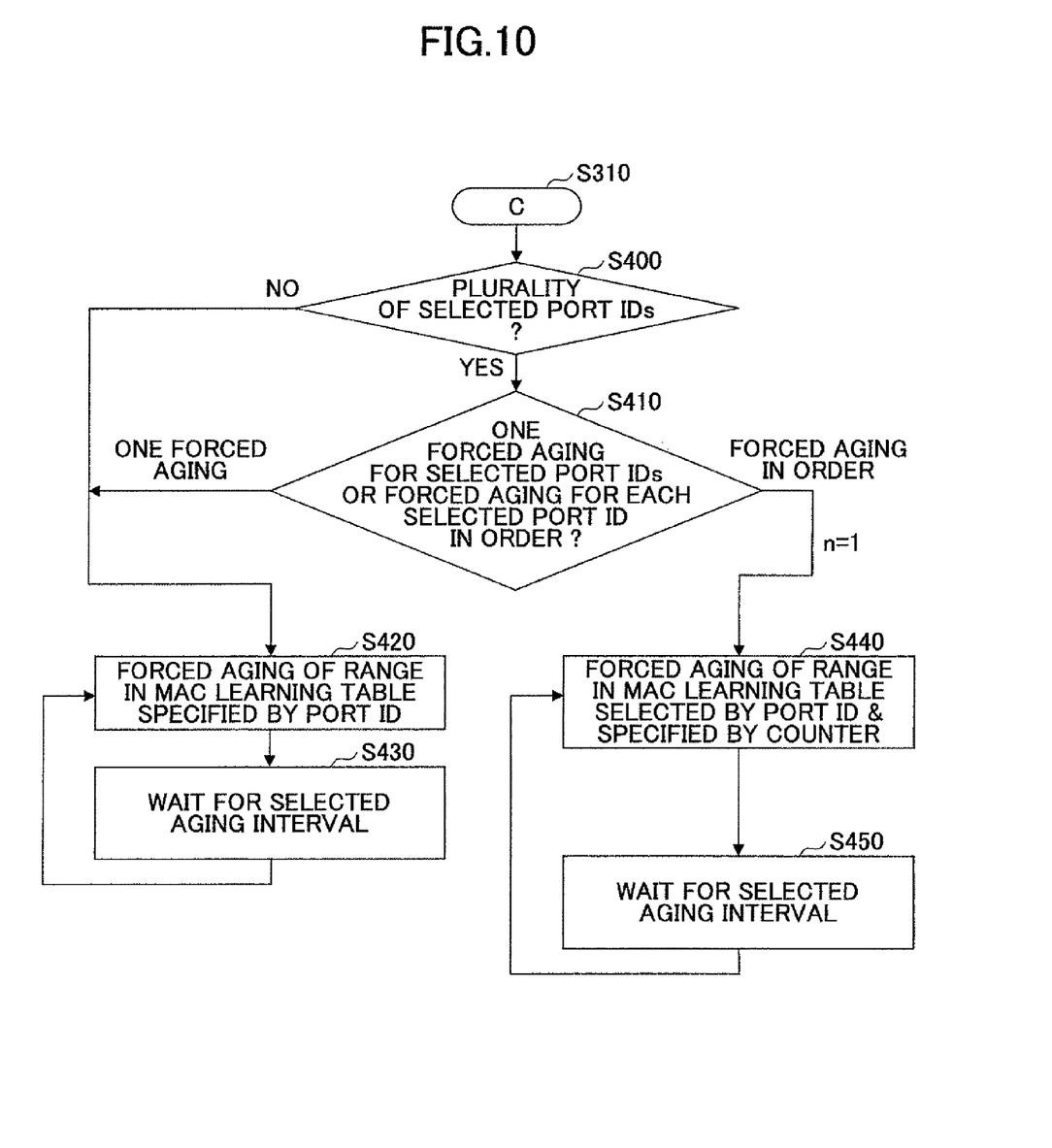
FIG. 10 is a flow chart for explaining the forced aging process of the frame transfer apparatus in the embodiment.

Next, a description will be given of an example of the forced aging process of the frame transfer apparatus 100, which erases the MAC learning table 140 in units of the port ID, by referring to FIG. 10. FIG. 10 is a flow chart for explaining this forced aging process of the frame transfer apparatus in this embodiment.

The learning information erasing unit 130 starts the forced aging process in the step S310. In a step S400, the learning information erasing unit 130 decides whether a plurality of port IDs have been selected when executing the forced aging process. If only one port ID has been selected and the decision result in the step S400 is NO, the process advances to a step S420 which will be described later.

On the other hand, if the decision result in the step S400 is YES, the learning information erasing unit 130 decides whether one forced aging process is to be performed periodically for the plurality of port IDs that have been selected or, the forced aging process is to be sequentially performed (that is, performed in an order) periodically for the plurality of port IDs that have been selected, in a step S410. The process advances to the step S420 in the former case in the step S410, and a counter (not illustrated) which counts the number of selected port IDs is set to "1" and the process advances to a step S440 in the latter case in the step S410. The counter may be provided within the learning information erasing unit 130 or, externally connected to the learning information erasing unit 130. For example, the counter may be formed by an internal timer of the CPU 210.

In the step S420, the learning information erasing unit 130 erases the information within the MAC learning table 140 in a range corresponding to the one or plurality of port IDs that have been selected. In a step S430, the learning information erasing unit 130 waits for the execution interval "a" set in the step S250 or the execution interval "b" set in the step S260, and after the execution interval "a" or "b" elapses, the learning information erasing unit 130 again erases the information within the MAC learning table 140 in the step S420. The frame transfer apparatus 100 repeats the process of the steps S420 and S430.

On the other hand, in the step S440, the learning information erasing unit 130 erases the information within the MAC learning table 140 in a range corresponding to the port ID that has been selected and is specified by the counter. The counter specifies the selected port ID in the order of the selected port IDs. The counter is incremented by "1" after the forced aging in the step S440 ends. In a step S450, the learning information erasing unit 130 waits for the execution interval "a" set in the step S250 or the execution interval "b" set in the step S260, and after the execution interval "a" or "b" elapses, the learning information erasing unit 130 again erases the information within the MAC learning table 140 in the step S440. The frame transfer apparatus 100 repeats the process of the steps S440 and S450.

By periodically and forcibly erasing the MAC learning table 140 by the forced aging process performed by the frame transfer apparatus 100, it is possible to receive the frame from a communicatable communication route when a failure is generated in the communication network, and the communication route may be modified because the MAC in the MAC learning table 140 is learned using the received frame.

The flooding process is periodically generated when the forced aging process is periodically performed by the frame transfer apparatus 100, and the load on the communication network may be increased thereby. However, by shifting the execution timing of the forced aging process in each of the frame transfer apparatuses 100 within the communication network or, limiting the range in which the information stored in the MAC learning table 140 is erased by the forced aging process, it is possible to suppress the increase of the load or, decrease the load on the communication network.

According to the frame transfer apparatus 100 disclosed heretofore, it is possible to form a network redundant structure without using the route control protocol between apparatuses, and facilitate the maintenance and operation of the communication network.

The order in which the embodiments or examples are described in this specification does not imply priorities of the embodiments or examples. Many other variations and modifications will be apparent to those skilled in the art.

All examples and conditional language recited herein are intended for pedagogical purposes to aid the reader in understanding the invention and the concepts contribute by the inventor to furthering the art, and are to be construed as being without limitation to such specifically recited examples and conditions, nor does the organization of such examples in the specification related to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A frame transfer apparatus comprising:
   a plurality of ports configured to transmit and receive frames which include transmitting source information and transmitting destination information;
   a processing unit configured to store information which relates the transmitting source information included in a frame received by a receiving port and port information of the receiving port in a learning table;
   a frame transmitting unit configured to transmit the received frame via one or plurality of ports that are identified by port information which is extracted from the learning table and corresponds to the transmitting destination information included in the received frame; and
   an erasing unit configured to forcibly erase the information stored in the learning table for every predetermined time regardless of how frequent a reference is made to the learning table,
   wherein the predetermined time is determined based on a converted value that is obtained by converting a Media Access Control (MAC) address of the frame transfer apparatus using a hash function.

2. The frame transfer apparatus as claimed in claim 1, wherein, when the frame is received via the receiving port and the transmitting source information included in the received frame and other port information are already stored in the learning table, the processing unit does not store information which relates the transmitting source information included in the received frame and the port information of the receiving port in the learning table, and the frame transmitting unit discards the received frame instead of transmitting the received frame.

3. The frame transfer apparatus as claimed in claim 1, wherein
   the frame further includes Virtual Local Area Network (VLAN) tag information that identifies a virtually formed network,
   the processing unit stores information which relates the transmitting source information included in the received frame, the port information of the receiving port, and the VLAN tag information of the received frame in the learning table, and
   the erasing unit erases information which is related to predetermined VLAN tag information from the learning table.

4. The frame transfer apparatus as claimed in claim 1, wherein the erasing unit erases information which is related to predetermined port information from the learning table.

5. The frame transfer apparatus as claimed in claim 1, wherein
   each of the transmitting source information and the transmitting destination information includes a MAC address.

6. The frame transfer apparatus as claimed in claim 1, wherein the frame transmitting unit transmits the received frame via all of the plurality of ports excluding the receiving port when port information corresponding to the transmitting destination information included in the received frame is not stored in the learning table.

7. The frame transfer apparatus as claimed in claim 1, wherein the erasing unit forcibly erases all of the information stored in the learning table for every said predetermined time, in order to periodically perform a forced aging process.

8. A frame transfer method to be implemented in a frame transfer apparatus having a plurality of ports transmitting and receiving frames which include transmitting source information and transmitting destination information, a processing unit, a frame transmitting unit, and an erasing unit, said frame transfer method comprising:

storing, by the processing unit, information which relates the transmitting source information included in the received frame and port information of a port which receives the received frame in a learning table;

transmitting, by the frame transmitting unit, the received frame via a port that is identified by port information which is extracted from the learning table and corresponds to the transmitting destination information included in the received frame; and     forcibly erasing, by the erasing unit, the information stored in the learning table for every predetermined time regardless of how frequent a reference is made to the learning table,     wherein the predetermined time is determined based on a converted value that is obtained by converting a Media Access Control (MAC) address of the frame transfer apparatus using a hash function.

9. The frame transfer method as claimed in claim 8, further comprising:

when the frame is received via the receiving port and the transmitting source information included in the received frame and other port information are already stored in the learning table, not storing, by the processing unit, information which relates the transmitting source information included in the received frame and the port information of the receiving port in the learning table, and discarding the received frame instead of transmitting the received frame, by the frame transmitting unit.

10. The frame transfer method as claimed in claim 8, wherein the frame further includes Virtual Local Area Network (VLAN) tag information that identifies a virtually formed network,     and further comprising:

storing, by the processing unit, information which relates the transmitting source information included in the received frame, the port information of the receiving port, and the VLAN tag information of the received frame in the learning table; and     erasing, by the erasing unit, information which is related to predetermined VLAN tag information from the learning table.

11. The frame transfer method as claimed in claim 8, wherein said forcibly erasing erases, by the erasing unit, information which is related to predetermined port information from the learning table.

12. The frame transfer method as claimed in claim 8, wherein each of the transmitting source information and the transmitting destination information includes a MAC address.

13. The frame transfer method as claimed in claim 8, wherein said transmitting transmits, by the frame transmitting unit, the received frame via all of the plurality of ports excluding the receiving port, when port information corresponding to the transmitting destination information included in the received frame is not stored in the learning table.

14. The frame transfer method as claimed in claim 8, wherein the forcibly erasing forcibly erases all of the information stored in the learning table by the erasing unit for every said predetermined time, in order to periodically perform a forced aging process.

* * * * *